(12) United States Patent
Poparad

(10) Patent No.: US 7,444,860 B1
(45) Date of Patent: Nov. 4, 2008

(54) TIRE SENSOR GROMMET TOOL AND METHOD

(75) Inventor: Jay Poparad, Lynchburg, VA (US)

(73) Assignee: Schrader Bridgeport International, Inc., Altavista, VA (US)

( * ) Notice: Subject to any disclaimer, the term of this patent is extended or adjusted under 35 U.S.C. 154(b) by 0 days.

(21) Appl. No.: 11/975,706

(22) Filed: Oct. 19, 2007

(51) Int. Cl.
*B60C 23/02* (2006.01)
(52) U.S. Cl. ...................................... 73/146.8
(58) Field of Classification Search ................ 73/146.8
See application file for complete search history.

(56) References Cited

U.S. PATENT DOCUMENTS

| | | | | |
|---|---|---|---|---|
| 2,559,847 A | * | 7/1951 | Brickman | 29/235 |
| 2,722,335 A | * | 11/1955 | Somes, Jr. | 100/230 |
| 5,553,368 A | * | 9/1996 | Barry | 29/423 |
| 2004/0013481 A1 | * | 1/2004 | Jeppesen | 408/201 |
| 2004/0250852 A1 | * | 12/2004 | Shipman | 137/231 |

* cited by examiner

*Primary Examiner*—Andre J Allen
(74) *Attorney, Agent, or Firm*—J. L. Mahurin, Esq.; J. A. Thurnau, Esq.; P. N. Dunlap, Esq.

(57) ABSTRACT

A tire pressure monitoring system (TPMS) sensor grommet tool has a U-shaped portion adapted to be inserted between a grommet disposed on the stem of a TPMS sensor and a seat at the base of the stem in which the grommet resides to separate the grommet from the seat for removal of the grommet from the TPMS sensor. The tool might also include an installation opening adapted to be disposed about the stem to guide and/or push a new grommet down the stem and into the seat. The leading edge of the tool, and/or and the U-shaped portion, may be beveled, to facilitate insertion of the U-shaped portion between the grommet and the seat. A flat side or ledge of the U-shaped portion may be adapted to separate the grommet from the seat, such as by levering against the seat to lift the grommet from the seat for removal.

16 Claims, 3 Drawing Sheets

TIRE SENSOR GROMMET TOOL AND METHOD

BACKGROUND OF THE INVENTION

1. Field of the Invention

This invention relates generally to Tire Pressure Monitoring System (TPMS) components and more particularly to a tool adapted for use to remove and/or install grommets on TPMS sensors.

2. Description of the Prior Art

A "clamp-in" style TPMS sensor typically includes an enclosure mounted on the internal end of a more-or-less conventional clamp-in tire valve for disposition within the wheel/tire cavity. Typically, the enclosure houses an electronic unit comprising a battery or other power source, a pressure sensor, control electronics, a radio transmitter, and/or other sensors, components and circuitry. The entire assembly may be potted to protect the electronics from the environment. Typically, the overall size and weight are kept to a minimum and the entire enclosure is located inside the wheel drop center well, thus preventing tire fitting and tire removal problems.

Problematically, TPMS sensors, service packs, tools, and installation procedures are relatively new to the tire industry. Typically, use of new sensor grommets, nuts, valve caps and valve cores is called for when performing any tire service on a vehicle equipped with clamp-in-type TPMS sensors. As a result, the most time consuming portion of TPMS service involves removal and replacement of TPMS sensor sealing components, and the installation of new TPMS service pack componentry, which includes a rubber grommet disposed at the base of the valve stem. This grommet is typically adapted to be pulled tight, such as by a nut disposed on the valve stem outside the wheel, to seal against the inside edge of a wheel through-hole. Conventionally, metal tools, such as side cutters or diagonal wire cutters have been used to cut the grommets off of the stems. Use of such tools, or cutting of the grommet using a knife or the like, can damage the sensor's valve stem, particularly if the stem is made from a relatively soft metal, such as aluminum, or other relatively soft material. Removal of TPMS sensor stem grommets by hand also creates a risk of personal injury and/or damage to the sensor through manual manipulation of the sensor by gripping of the sensor enclosure.

SUMMARY

The present invention is directed to systems and methods which provide for separation of a rubber grommet from the stem of a TPMS sensor without causing damage to the associated seat and/or the threaded portion of the stem. This may be of particular importance when the stem, and thus the grommet seat, are made from aluminum or other relatively soft metal or material.

In accordance with embodiments of the present invention an integral tire pressure monitoring system sensor grommet tool has a U-shaped portion, and possibly an installation opening portion. The U-shaped portion is preferably adapted to be inserted between a grommet disposed on the stem of a tire pressure monitoring system sensor and a seat at the base of the stem in which the grommet resides to separate the rubber grommet from the seat for removal of the grommet from the tire pressure monitoring system sensor. The U-shaped portion may be beveled to facilitate insertion of the U-shaped portion between the grommet and the seat and a leading edge of the tool may be beveled to facilitate insertion of the beveled edge of the U-shaped portion of the tool between the grommet and the seat. The installation opening is adapted to be disposed about the stem to guide and push a new grommet down the stem and into the seat.

In various embodiments the U-shaped portion beveled edge is adapted to be inserted between the grommet and the seat, while the opposite side of the U-shaped portion is adapted to be used to separate the grommet from the seat, such as by levering or prying the grommet out of the seat following insertion of the beveled edge of the U-shaped portion of the tool between the grommet and the seat. In other words, the flat side of the U-shaped portion is preferably adapted to be levered against the seat to lift the grommet from the seat for removal.

In use, the U-shaped portion of the tire pressure monitoring system sensor grommet tool is inserted between the rubber grommet disposed in a seat of tire pressure monitoring system sensor and the seat. Then the grommet is lifted from the seat, such as by levering the tool against the seat to lift the seal out of the seat. Preferably, lifting of the seal is carried out without interfering with, or damaging, the stem, in particular without damaging threads defined on the stem.

To install a new grommet, the new grommet is disposed on the stem of the tire pressure monitoring system sensor and the installation opening defined by the tire pressure monitoring system sensor grommet tool is placed about the stem. Then, with the installation opening disposed about the stem, the new grommet is guided along the stem and into the seat using the tool.

Thus, the various embodiments of the present invention are particularly well suited to facilitate separation of the rubber grommet from an aluminum stem without causing damage to the aluminum grommet seat and/or the threaded portion of the aluminum stem. The U-shaped beveled portion of various embodiments of the present tool is designed to separate the rubber grommet from the aluminum seat area. The flat side ledge of the U-shaped area is preferably designed and dimensioned to lift and remove the rubber grommet from the stem without interfering or damaging the stem, particularly the threaded area of the stem. Preferably, a hole defined in a handle portion of various embodiments of the present tool is designed and dimensioned to capture, and aid in the installation of, a new rubber grommet over the valve stem, into the seat area. Thus, the present invention enhances the service a tire technician can provide. Optionally, the tool might include a second, preferably smaller, hole which may be used to attach the tool to a key chain, lanyard, or the like. Thus, the present tool is a small, easy to use, hand held tool that can be stored in a technician's pocket, on a key ring, or on a lanyard. Although embodiments of the present tire sensor grommet tool may be cast out of metal or machined from metal, preferred embodiments are injection molded, machined or otherwise produced in accordance with methods known to those of ordinary skill in the art out of plastic or a similar non-metallic, resilient compound. The present tool is preferably formed from a resilient material such as plastic or nylon in the interest of avoiding damage to aluminum steams or the like during use. Preferably, the present tool is dimensioned to for use with multiple grommet and TPMS sensor stem designs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
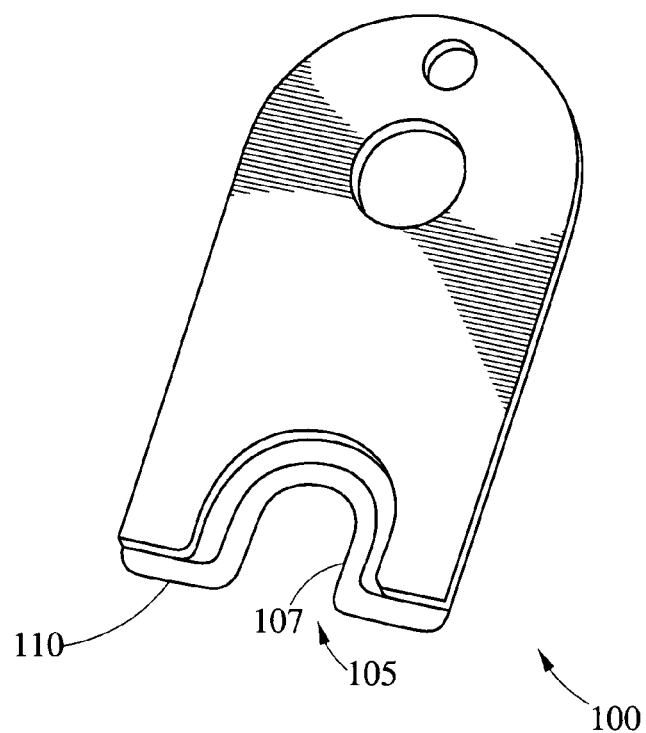
FIG. 1 is a perspective view of an embodiment of the present tool.
Figure 2:
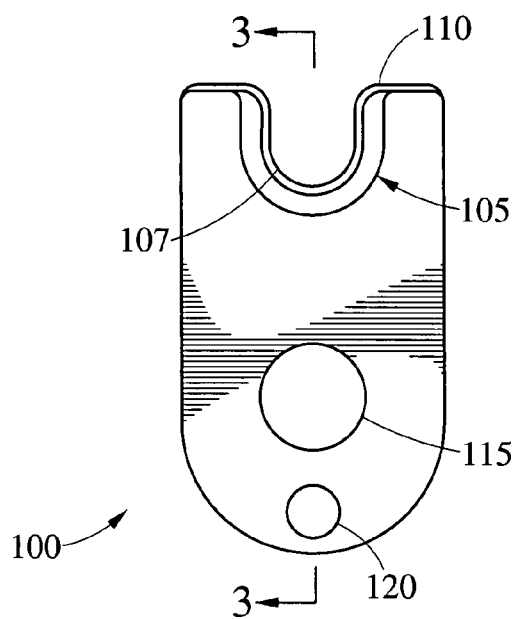
FIG. 2 is a top plan view of the tool embodiment of FIG. 1.
Figure 3:
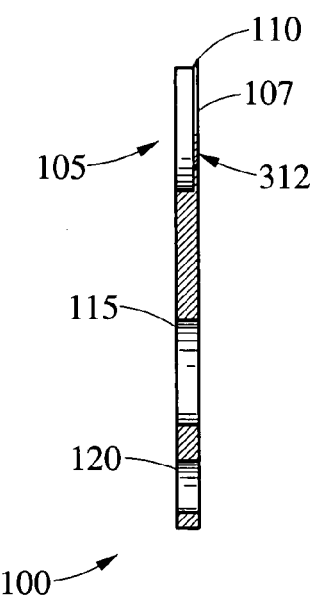
FIG. 3 is a generally cross-sectional view of the tool embodiment of FIGS. 1 and 2, taken generally along line 3-3 of FIG. 2.
Figure 4:
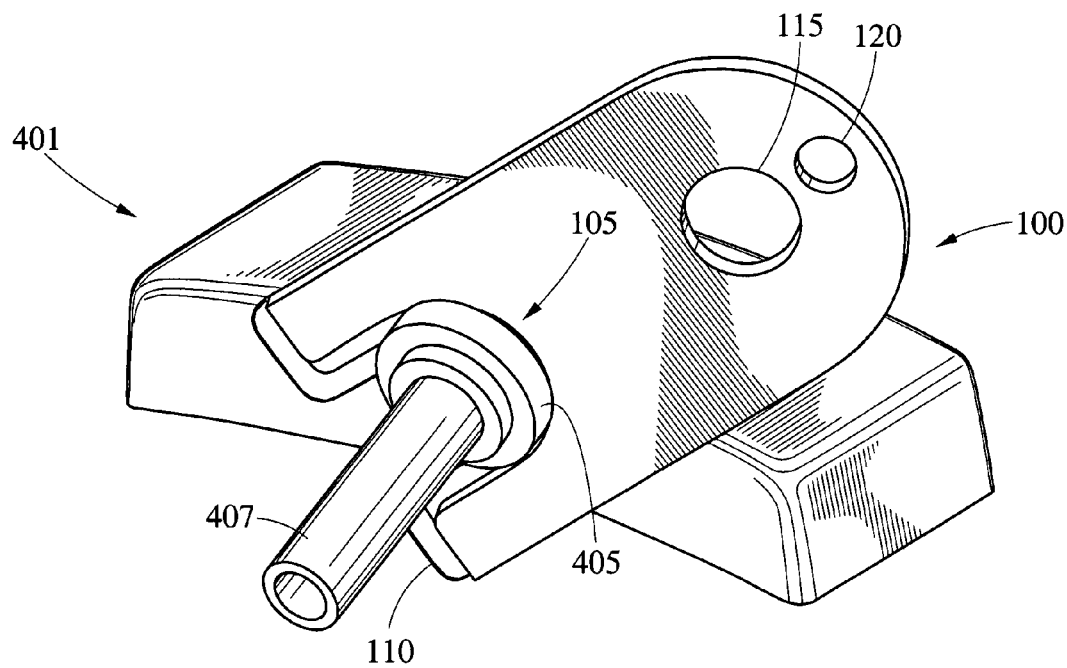
FIG. 4 is an environmental view of the embodiment of the present tool shown in FIGS. 1-3 in use to remove a TPMS sensor grommet in accordance with embodiments of the present systems and methods.

Turning to the Figures, FIG. 1 is a perspective view of an embodiment of tool 100, while FIG. 2 is a top plan view of tool 100. To help understand the structure of tool 100 shown in FIGS. 1 and 2, FIG. 3, a generally cross-sectional view of tool 100, taken generally along line 3-3 of FIG. 2 should be referenced. Reference to FIG. 4, an environmental view of tool 100 in use to remove a TPMS sensor grommet, and/or FIG. 5, an environmental view of tool 100 in use to install a TPMS sensor grommet, will be helpful for identification of the various parts of sensor 401 and use of tool 100.

The illustrated embodiment of integral tire pressure monitoring system sensor grommet tool 100 has a generally U-shaped portion 105 adapted to be inserted between grommet 405 disposed on stem 407 of tire pressure monitoring system sensor 401 and a seat at the base of stem 407 in which grommet 405 resides to separate rubber grommet 405 from the seat for removal of grommet 405 from tire pressure monitoring system sensor 401. Inner edge 107 of U-shaped portion 105 may be beveled to facilitate insertion of U-shaped portion 105 between grommet 405 and the seat as shown in FIG. 4. Also, leading edge 110 of tool 100 may be beveled to facilitate insertion of beveled inner edge 107 of U-shaped portion 105 of tool 100 between grommet 405 and the seat. In various embodiments, the U-shaped portion beveled edge is adapted to be inserted between the grommet and the seat, while opposite flat ledge or side 312 of the U-shaped portion (as best seen in FIG. 3) is adapted to be used to separate the grommet from the seat, such as by levering the grommet out of the seat following insertion of the beveled edge of the U-shaped portion of the tool between the grommet and the seat. In other words, flat side 312 is preferably adapted to be levered against the seat to lift the grommet from the seat for removal, as shown in FIG. 4.

Figure 5:
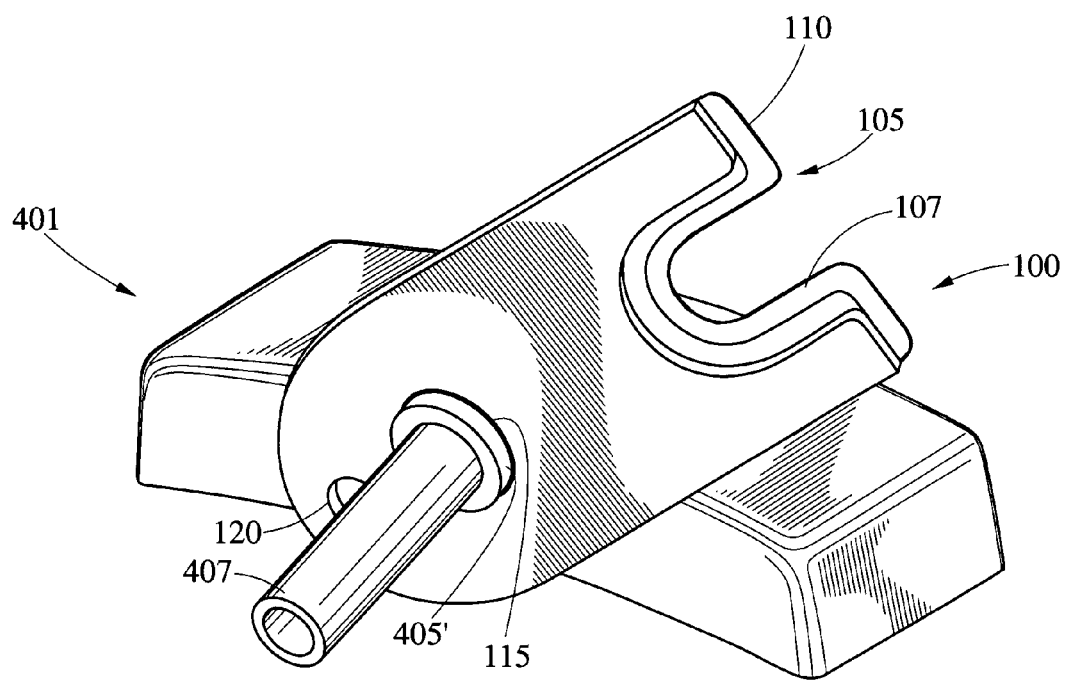
FIG. 5 is an environmental view of the embodiment of the present tool shown in FIGS. 1-3 in use to install a TPMS sensor grommet in accordance with embodiments of the present systems and methods.

As noted, FIG. 5 is an environmental view of the embodiment of the present tool shown in FIGS. 1-3 in use to install a TPMS sensor grommet. Installation opening 115 is adapted to be disposed about the stem to guide and/or push new grommet 405' down stem 407 and into the seat. Preferably, embodiments of the present tool are designed and dimensioned for use with multiple grommet and/or TPMS stem designs.

Figure 6:
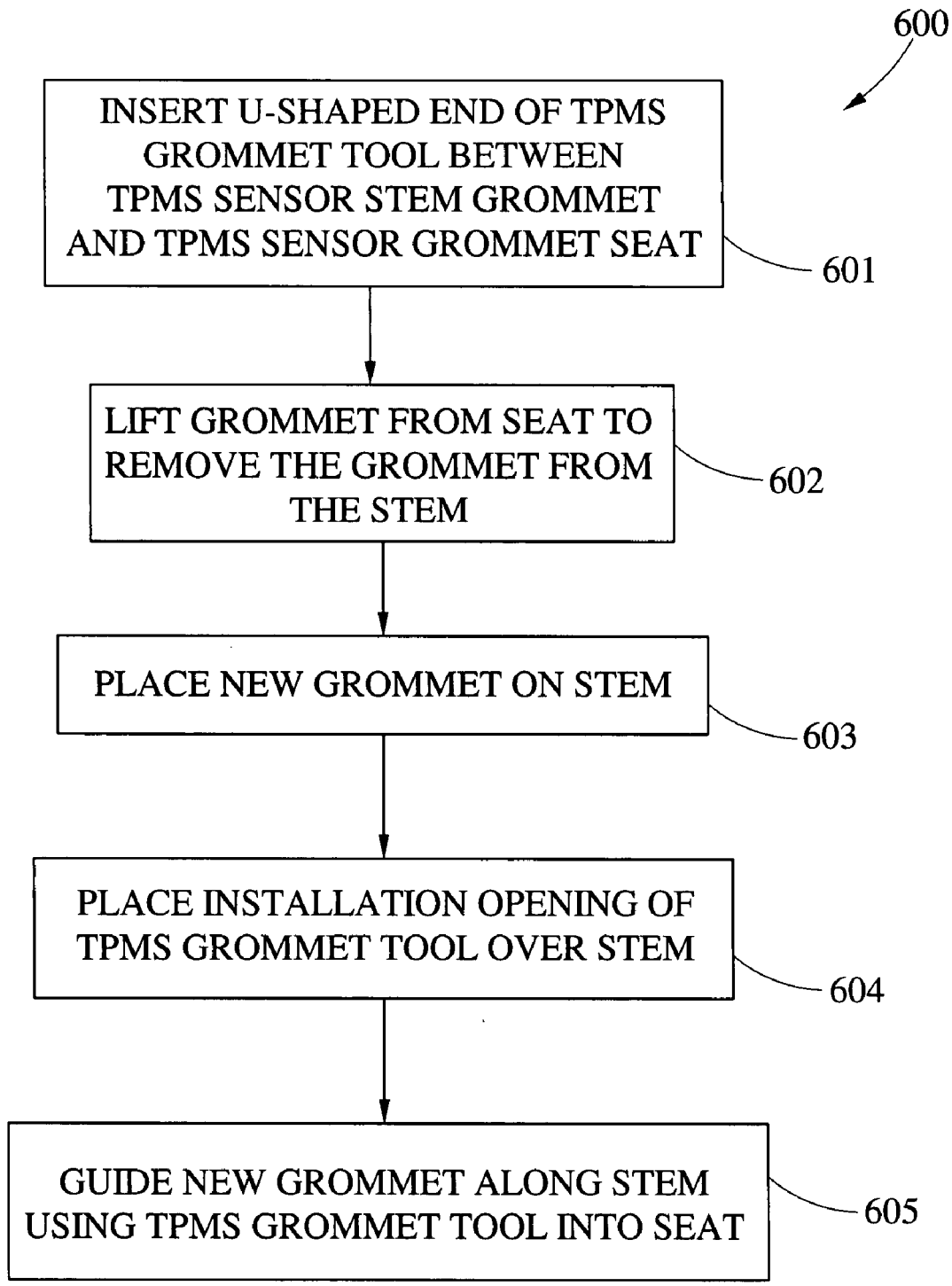
FIG. 6 is a flow chart of an embodiment of a method for replacing a TPMS sensor grommet in accordance with embodiments of the present invention.

With the above in mind, method embodiment 600 for replacing a TPMS grommet might include the following steps, depicted in FIGS. 4 and 5, and flow-charted in FIG. 6. At 601 U-shaped portion 105 of tire pressure monitoring system sensor grommet tool 100 is inserted between rubber grommet 405, disposed in the seat of tire pressure monitoring system sensor 401, and the seat. Then, at 602, grommet 405 is lifted from the seat by levering the tool against the seat to lift grommet 405 out of the seat. Preferably, lifting of grommet 405 at 602 does not damage threads defined on stem 407. In particular, the present tool and method for its use are particularly well suited to facilitate separation of rubber grommet 405 from an aluminum stem or the like, without causing damage to an aluminum seat and/or the threaded portion of such an aluminum stem. U-shaped beveled portion 105 of embodiments of tool 100 is designed to separate rubber grommet 405 from an aluminum seat area in step 601, while flat side ledge 312 of the U-shaped portion is preferably designed and dimensioned to lift and remove the rubber grommet from the aluminum stem without damaging the aluminum stem, particularly the threaded area of the stem in step 602.

To install new grommet 405', new grommet 405' is disposed on stem 407 of tire pressure monitoring system sensor 401 in a proper orientation at 603. At 604 installation opening 115 defined by tire pressure monitoring system sensor grommet tool 100 is placed over stem 407 and into contact with new grommet 405'. Then, at 605, new grommet 405' is guided and/or pushed along stem 407 and into the seat using tool 100. Installation opening 115 is preferably dimensioned, in certain embodiments having a 0.5 inch diameter, to capture new rubber grommet 405' in step 604 and to aid in the installation of new rubber grommet 405' over an aluminum stem, into the seat area, in step 605.

Embodiments of tool 100, such as those depicted in the accompanying drawings may include optional second hole 120, which is preferably not vital to functionality of tool 100. Hole 120 may be used to attach tool 100 to a key chain, lanyard, or the like. Preferred resilient embodiments of tool 100 can be injection molded from plastic or the like. However, rigid embodiments of tool 100 may be machined from metal, such as aluminum or steel. Similarly, other rigid embodiments of tool 100 may be stamped or forged from metal. As discussed above, embodiments of the present grommet tool are preferably injection molded or machined out of plastic or a similar non-metallic, resilient compound or otherwise produced in accordance with methods known to those of ordinary skill in the art in the interest of providing a tool that avoids damaging aluminum steams or the like during use.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integral tire pressure monitoring system sensor grommet tool comprising a U-shaped portion adapted to be inserted between an existing grommet disposed on the stem of a tire pressure monitoring system sensor and a seat at the base of the stem in which the existing grommet resides to separate the existing grommet from the seat for removal of the existing grommet from the tire pressure monitoring system sensor.

2. The tool of claim 1, further comprising an installation opening defined in the tool adapted to be disposed about the stem to guide a new grommet down the stem and into the seat.

3. The tool of claim 1, wherein a leading edge of the tool is beveled to facilitate insertion of the U-shaped portion between the existing grommet and the seat.

4. The tool of claim 1, wherein the U-shaped portion is beveled to facilitate insertion of the U-shaped portion between the existing grommet and the seat.

5. The tool of claim 4, wherein a leading edge of the tool is beveled to facilitate insertion of the beveled edge of the U-shaped portion of the tool between the existing grommet and the seat.

6. The tool of claim 1, wherein the U-shaped portion has a beveled edge and an opposite flat ledge, the beveled edge adapted to be inserted between the existing grommet and the seat, the flat ledge adapted to separate the existing grommet from the seat.

7. The tool of claim 6, wherein the flat ledge is adapted to be levered against the seat to lift the existing grommet from the seat for removal.

8. A method comprising
inserting a U-shaped portion of a tire pressure monitoring system sensor grommet tool between an existing grommet disposed in a seat of tire pressure monitoring system sensor and the seat; and
lifting the existing grommet from the seat with the tool for removal of the grommet from the sensor.

9. The method of claim 8 wherein said lifting comprises levering the tool against the seat to lift the existing grommet from the seat.

10. The method of claim 8 wherein said lifting is carried out without interfering with or damaging the stem.

11. The method of claim 8 wherein said lifting is carried out without damaging threads defined on the stem.

12. The method of claim 8 further comprising:
disposing a new grommet on a stem of the tire pressure monitoring system sensor;
placing an installation opening defined by the tire pressure monitoring system sensor grommet tool about the stem; and
guiding the new grommet along the stem and inserting the new grommet into the seat using the tool, with the installation opening disposed about the stem.

13. A method comprising
inserting a U-shaped portion of a tire pressure monitoring system sensor grommet tool between an existing grommet disposed in a seat at the base of a stem of a tire pressure monitoring system sensor and the seat;
lifting the existing grommet from the seat;
removing the existing grommet from the stem;
disposing a new grommet on the stem;
placing an installation opening defined by the tire pressure monitoring system sensor grommet tool about the stem;
guiding the new grommet along the stem toward the seat using the tool with the installation opening disposed about the stem; and
inserting the new grommet into the seat using the tool, with the installation opening disposed about the stem.

14. The method of claim 13 wherein said lifting comprises levering the tool against the seat to lift the grommet from the seat.

15. The method of claim 13 wherein said lifting, guiding and inserting are carried out without interfering with or damaging the stem.

16. The method of claim 13 wherein said lifting, guiding and inserting are carried out without damaging threads defined on the stem.

* * * * *